United States Patent [19]

Terashita

[11] Patent Number: 4,594,645
[45] Date of Patent: Jun. 10, 1986

[54] ILLUMINATING REFLECTOR

[76] Inventor: Yutake Terashita, 6-12, Nigawa-Takadai, 2-chome, Takarazuka-shi, Kyogo-ken, Japan

[21] Appl. No.: 669,855

[22] Filed: Nov. 9, 1984

[30] Foreign Application Priority Data

Nov. 11, 1983 [JP] Japan .................................. 58-212946

[51] Int. Cl.⁴ .............................................. G03B 15/02
[52] U.S. Cl. ..................................... 362/18; 362/278; 362/352; 362/359
[58] Field of Search .................... 362/16, 17, 18, 7, 8, 362/307, 320, 327, 329, 277, 278, 352, 358, 359, 450

[56] References Cited

U.S. PATENT DOCUMENTS

| | | | |
|---|---|---|---|
| 2,205,860 | 6/1940 | Olds | 362/18 |
| 2,907,873 | 10/1959 | Smith | 362/320 |
| 3,851,164 | 11/1974 | Intrator | 362/18 |
| 4,052,607 | 10/1977 | Larson | 362/320 |
| 4,446,506 | 5/1984 | Larson | 362/18 |

Primary Examiner—William A. Cuchlinski, Jr.
Attorney, Agent, or Firm—Oblon, Fisher, Spivak, McClelland & Maier

[57] ABSTRACT

An illuminating reflector is composed of a stick which is adapted to be detachably inserted into a stick holding aperture formed in an illuminator, an actuating runner which pivotally connects a plurality of dome ribs and is slidably inserted onto the stick, a reflection sheet which is put on the ribs and cause diffusingly reflection of light, a fixed collar secured at the top portion of the stick, and struts which are pivoted at their opposite ends respectively to the fixed collar and to the midway of the ribs. Therefore, the reflector can be opened by displacing the runner toward the fixed collar to flare the reflection sheet in a shape of a box, while when removing the runner counterwardly, the reflector can be folded into a compact form. The reflector further comprises a flexible cover which is provided in succession to a narrow end of the reflection sheet and to the flared open end of the reflection sheet being attached a light permeable diffuser screen so that an illuminant of the illuminator is accommodated within the box-shaped reflector.

4 Claims, 6 Drawing Figures

ILLUMINATING REFLECTOR

FIELD OF THE INVENTION

This invention relates to an illuminating reflector which is capable of diffusing light from an illuminator provided with an illuminant such as an electric flash, lamp and the like so as to illuminate a shooting substance in an appropriate manner.

BACKGROUND OF THE INVENTION

On taking a photograph or a movie, besides directly illuminating from a light source to a shooting substance, a reflector is often used for diffusing light from an illuminator in order to adjust the emitted light from an illuminant as the light source for making suitable light to the shooting substance depending upon the circumstances, kinds and the like of the shooting. Two kinds of reflectors are generally used for such purposes, one of which is a parasol type reflector, the other being a box type one.

The conventional parasol type reflector has a generally similar construction of a normal parasol but is used the inner surface of the top cover as a reflecting surface for the purpose of causing diffusingly reflection of the illuminating light. In order to support the reflector with the illuminator, an aperture is formed in the illuminator to be adapted for inserting a stick of the parasol to face the reflecting inner surface to the illuminant, thereby causing the illuminant light to diffuse and reflect toward the shooting substance. On the contrary, the other box type reflector has a configuration of a substantially pyramid-shaped box, the four side walls of which serves as a reflection surface and light permeable diffuser screen being covered over the opened fore end area. This type reflector is installed to the illuminator for accommodating the illuminant therewithin so that light emitted from the illuminant is caused to diffusingly reflect on the reflection surface, then further bringing about additional diffusing upon passing through the diffuser screen, thereby ensuring uniform illumination to the shooting substance with wide range not going to waste. The thus constructed two types of reflectors are installed to an illuminant if occasion requires on taking a photograph or movie. However, since they are bulky in their fabricated states, it is essentially required to be kept in a compact form when out of use, and to attain easy and quick assembling to the operable form at the time of use.

In this instance, the parasol type reflector which is constructed similar to a parasol has such advantages that it is adapted to be installed to the illuminator merely by opening the top cover and inserting the stick into the holding aperture. The reflector can be compactly folded in a similar manner by closing the parasol when it is not used. However, this type of reflector has an inherent drawback that considerable amount of light will be unavailingly spreading out everywhere to become worse the illuminating efficiency.

On the other hand, the box type reflector is superior in illuminating efficiency to the parasol type one due to the fact that the spreading light can be substantially eliminated. In order to form this reflector into collapsible pyramid shape, it is required to have several number of supporting ribs along respective edges of the pyramid as a framework, a fitting member for fixing ends of the ribs and a connecting member provided around the illuminator so as to allow installation of the reflector. Therefore, a detrimental disadvantage resides in the box type reflector that the structure of the device is complicated and increased members to be assembled, and further becoming costly as well as very troublesome of mounting and dismantling the same to and from the illuminator. Actually, commercially available box type reflectors take 10 to 15 minutes for installing to the illuminator.

OBJECTS OF THE INVENTION

Accordingly, it is an object of the present invention to provide an illuminating reflector which is capable of effectively and suitably illuminating a shooting substance.

It is another object of the present invention to provide an illuminating reflector which is able to form a box type reflector which is simple in construction, and easy in fabricating and folding operation as is a parasol type reflector.

It is further object of the present invention to provide an illuminating reflector wherein easy mounting to and dismantling out of the illuminator is assured as well as foldable into a compact form.

SUMMARY OF THE INVENTION

According to the present invention, there is provided a stick to be adapted for detachably inserting into a stick holding aperture formed in an illuminator having an illuminant, an actuating runner slidably inserted onto said stick, a plurality of dome ribs pivotally connected at respective one ends to said runner, a reflection sheet put on to said dome ribs for causing diffusingly reflection of light emitted from said illuminant, a fixed collar being secured at the top portion of said stick, a plurality on a struts pivotally connected of respective opposite ends to said fixed collar and to each of said ribs at the midway, a flexible cover for covering said illuminator being attached to a narrowed end of said reflection sheet, and a diffuser screen detachably attached to an opening end of said reflection sheet.

As explained above, since the present invention has the construction that the reflection sheet which is adapted to surround the illuminant is composed in the form of a parasol to allow easy changing between the flared open state and the folded closed state, a box type reflector can be constructed with a simple construction and easy handling like a parasol type reflector. In addition, since a normal illuminator has an aperture to accept a stick of the parasol type reflector, the reflector of the present invention can be installed the conventional reflector without changing the design. Further, since the cover is formed with a flexible material, the reflector can be simply and easily mounted to any illuminator irrespective of the size of the illuminator per se or its lamp shade, or even if no lamp shade is epuiped to the illuminator.

BRIEF DESCRIPTION OF THE DRAWINGS

These and other objects, features and advantages of the present invention will become apparent more clearly upon a reading of the following detailed specification and drawing, in which.

DETAILED DESCRIPTION OF THE PRESENTLY PREFERRED EMBODIMENT

Figure 1:
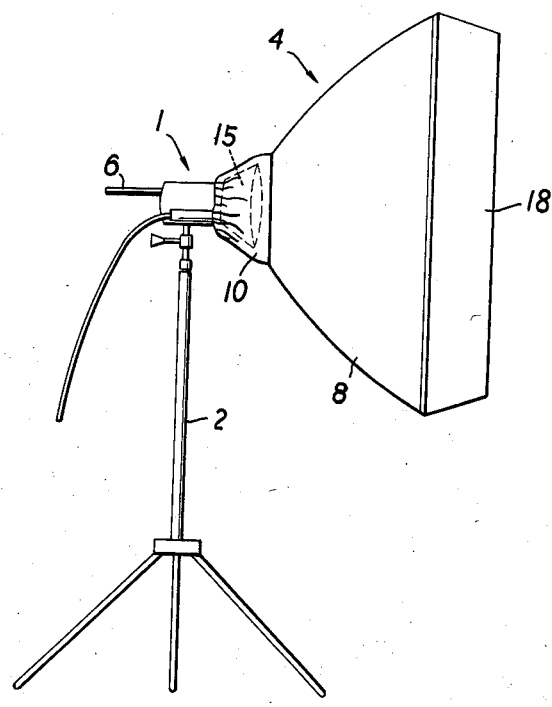
FIG. 1 is an exterior view of an illuminating apparatus on which is installed the reflector of the present invention.
Figure 2:
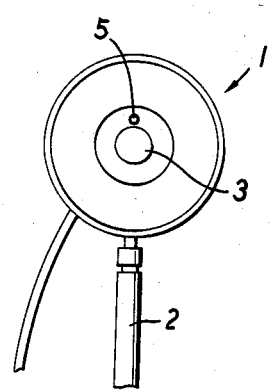
FIG. 2 is a front elevational view of the illuminator.
Figure 3:
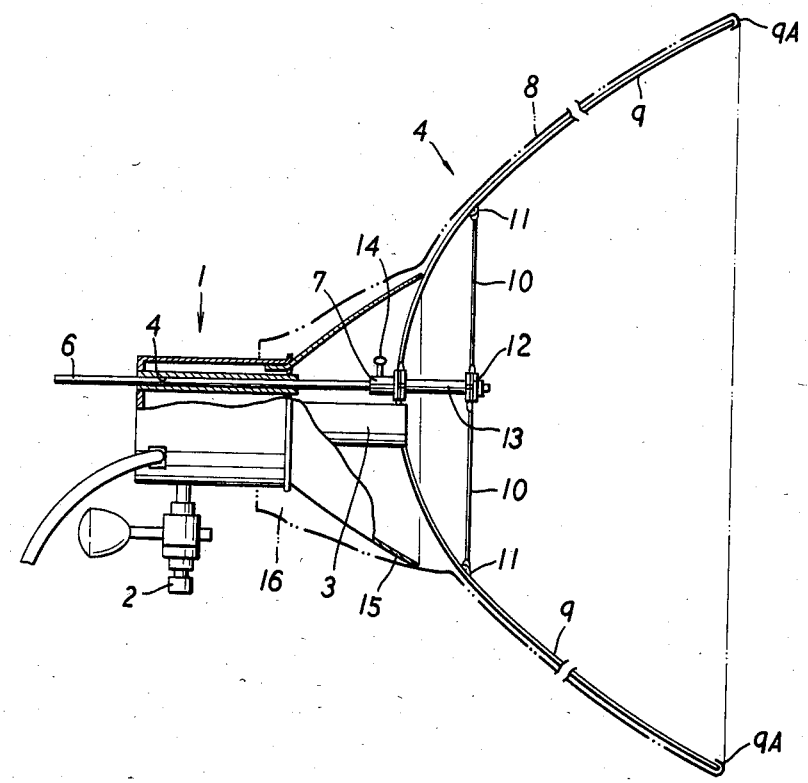
FIGS. 3 and 4 are diagramatic structural views respectively showing different operations.

Referring now to FIGS. 1 to 3, reference numeral 1 denotes a well-known illuminator which is supported at the upper portion of a stand 2, and attached at the front portion thereof is an illuminant 3 such as an electric flash, lamp and the like. The illuminator 1 has a stick holding aperture adapted to accept a stick of a reflector of known parasol type as explained hereinbefore, and a reflector 4 is capable of mounting to the illuminator 1 in the manner similar to the parasol type one.

The reflector 4 has a configuration of a truncated pyramid like box which is capable of accommodating the illuminant 3 therewithin and is detachably supported by the illuminator 1 by inserting a stick 6 into a stick holding aperture 5 of the illuminator 1.

An actuating runner 7 which is pivotally connected with respective one end of four dome ribs 9 is slidably inserted onto the stick 6. Between respective adjacent ribs 9, a circumferential reflection sheet 8 which has a white inner surface to facilitate the causing illuminant diffused reflection of light emitted from the illuminator 3 is put on. Further, struts 10 are pivoted by means of connecting members 11 to the midway of respective dome ribs 9, while the other ends of the struts 10 are, respectively, pivotally connected to a fixed collar 12 which is fixedly mounted at the top portion of the stick 6. A sleeve 13 for defining the movable range of the runner 7 is inserted onto the stick 6 in a position between the runner 7 and the collar 12.

Figure 4:
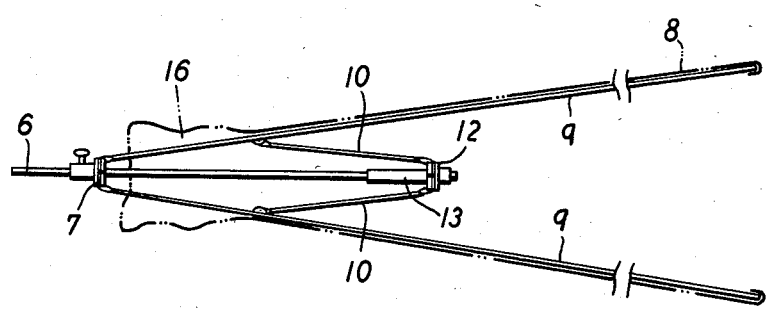

The reflector 4 can, therefore, be opened and closed by bringing about a sliding movement of the runner 7 along the stick 6. When the runner 7 is moved toward the collar 12 to the position restricted by the sleeve 13, the reflection sheet 8 is brought into flared open position as shown FIG. 3. On the other hand, when the runner 7 is displaced counterwardly to the just-mentioned open position, the reflection sheet 8 can be folded as shown in FIG. 4. Then, a set screw 14 is provided on the runner 7 so as to lock the runner 7 at the opened operable position.

Figure 5:
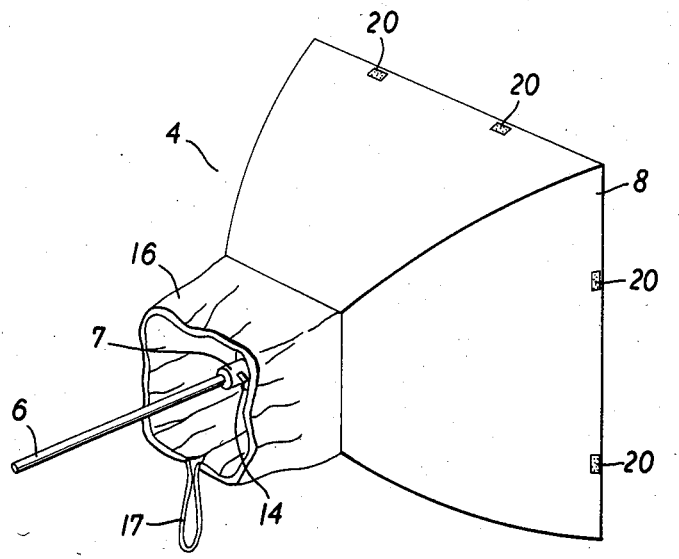
FIG. 5 is a perspective view of the reflector.
Figure 6:
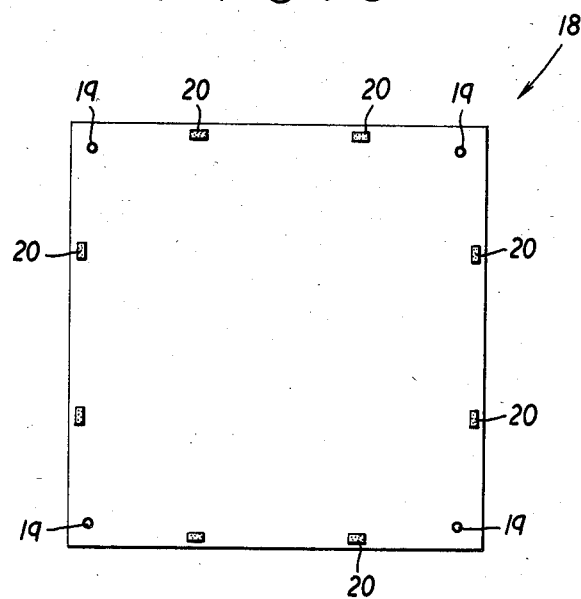
FIG. 6 is a rear elevation view of the diffuser screen.

As seen from FIG. 1 and FIG. 5, a flexible cover 16 which is given a sleeve-shaped form is attached to the narrowed end of the reflection sheet 8 so as to envelope a lamp shade 15 surrounding the illuminant 3 of the illuminator 1. An operating rope 17 as an operation means is provided at the open edge portion of the flexible cover 16 so that light emitted from the illuminant 3 is prevented from leaking out by putting the cover 16 over the shade 15 and pulling the operation rope 17 to closely contact the cover 16 onto the periphery of the shade 15. On the other hand, the flared open end of the pyramid shaped reflection sheet 8 is covered by a diffuser screen 18 as shown in FIG. 6. The diffuser screen 18 is a white semi-transparent flexible sheet made of synthetic resin which has fine ruggedness on one side, and the other side of which has a flat surface. The diffuser screen 18 is attached to the opening end of the reflection sheet 8 with the rugged side directed outwardly so that the screen 18 permits to permeate almost all light of the illuminant 3 therethrough with causing diffusion.

To allow easy attachment of the diffuser screen 18 to the reflection sheet 8, mounting holes 19 are formed at the four corner portions of the screen for receiving free end portion 9A of respective ribs 9 and fastening members 20 consisting of paired male-and-female tape fasteners are affixed at the intermediate portions of respective sides of the diffuser screen 18 and the reflection sheet 8.

In a case of assembling the reflector and installing it to the illuminator 1, the actuating runner 7 is displaced up to the position that the sleeve 13 is held stationary between the runner 7 and the fixed collar 12 so as to make the reflection sheet 8 flare in the form of the truncated pyramid, and then the runner 7 is locked by screwing in the set screw 14. Further, the stick 6 is inserted into the aperture 5 of the illuminator 1 and is fixed with an appropriate fixing member (not shown). In this connection, an illuminator generally has an aperture for fitting a stick of a parasol type reflector so that this aperture can be used as the holding aperture 5 not only for inserting the stick of the parasol type reflector but also for the reflector of the present invention. Subsquently, the flexible cover 16 is put on the outer periphery of the lamp shade 15, then the rope 17 is pulled and tied to close tightly thereupon. After then, the diffuser screen 18 is attached to the opening end of the reflection sheet 8 with rugged surface faced outwardly. By the manner as explained above, the reflector is installed to the illuminator 1 in an operable fashion. The work for installing the reflector does not need more than one minute.

Since the illuminant 3 is disposed within the box defined by the reflection sheet 8 and diffuser screen 18, illumination to the subject to be shot can be made in such facilitated manner that the emitted light becomes soft and uniformly diffused over a wide area by diffusingly reflected on the surface of the reflection sheet 8 and further widely diffused upon passing through the diffuser screen 18.

The stick holding aperture 5 is normally formed away from the center portion of the illuminator as shown in FIG. 2 due to mounting the illuminant 3 at this center portion. However, there is no problem to accommodate the reflector into the pyramid-shaped box despite of the eccentric arrangement of the aperture 5 because the cover 16 is made of a flexible material. In addition, providing relatively large opening to the cover 16, it can smoothly cover up any lamp shade irrespective of its configuration. Further, by arranging the tightening amount of the rope 17 which is provided for the cover 16, it can close tightly any lamp shade or even without shade for preventing completely from leakage of light. Moreover, the reflector can be folded in the compact form by removing the stick 6 from the illuminator 1 and also removal of the diffuser screen 18 from the reflection sheet 8.

In accordance with the foregoing embodiment, there is shown that the reflection sheet 8 has substantially square open end, but this may take any other shape such as, other rectangular or polygon. As other fastening member for attaching the diffuser screen to the reflection sheet, it may be other means such as a hook, button, zipper and the like. Further, the operating rope 17 may be replaced by a rubber band.

Although the invention has been described in its preferred form with a certain degree of particularity, it is understood that the present disclosure of the preferred form may be changed in the details of construction, and other combination and arrangement of parts may be resorted to without departing from the spirit and the scope of the invention as hereinafter claimed.

What is claimed is:

1. An illuminating reflector which comprises:
   (a) a stick having a rearward end and a forward end, the rearward end of said stick being adapted to be detachably inserted into a stick holding aperture in an illuminator;
   (b) an acuating runner slidably disposed on said stick;
   (c) means for selectively fixing said actuating running in either a first position on said stick or in a second position on said stick, said first position being forward of said second position;
   (d) a plurality of dome ribs each of which has a rearward end and a forward end, the rearward end of each of said plurality of dome ribs being pivotally connected to said actuating runner;
   (e) a fixed collar secured to the forward end of said stick;
   (f) a plurality of struts each of which has a rearward end and a forward end, the forward end of each said plurality of struts being pivotally connected to said fixed collar and the rearward end of each plurality of struts being pivotally connected to a corresponding one of said plurality of dome ribs intermediate the rearward and forward ends thereof;
   (g) a flexible reflection sheet having a forward end and a rearward end, said flexible reflection sheet being mounted on said plurality of dome ribs;
   (h) a flexible cover having a forward end and a rearward end, the forward end of said flexible cover being attached to the rearward end of said flexible reflection sheet and the rearward end of said flexible cover being adapted to prevent light from the illuminator from leaking out rearwardly; and
   (i) a diffuser screen detachably attached to the forward end of said flexible reflection sheet,
   whereby, when said actuating runner is fixed in its first, forward position, said struts force said plurality of dome ribs outwardly, opening the illuminating reflector, and when said actuating runner is fixed in its second, rearward position, said struts pivot inwardly and rearwardly and said dome ribs pivot inwardly and forwardly.

2. An illuminating reflector as recited in claim 1 wherein the forward end of said reflection sheet is at least substantially square.

3. An illuminating reflector as recited in claim 1 wherein said diffuser screen is attached to the forward end of said flexible reflection sheet by means selected from the group consisting of male-female tape fasteners, hook-and-eye fasteners, and a zipper.

4. An illuminating reflector as recited in claim 1 and further comprising means for closing said flexible cover tightly around the outer periphery of the illuminator.

* * * * *

UNITED STATES PATENT AND TRADEMARK OFFICE
CERTIFICATE OF CORRECTION

PATENT NO. : 4,594,645
DATED : June 10, 1986
INVENTOR(S) : Terashita, Yutake

It is certified that error appears in the above-identified patent and that said Letters Patent is hereby corrected as shown below: Title page:

-- The Inventor's address is incorrect on the Letters Patent. It should read as follows:

Yutake Terashita, 6-12, Nigawa-Takadai 2-chome, Takarazuka-shi, Hyogo-ken, JAPAN. --

Signed and Sealed this

Nineteenth Day of August 1986

[SEAL]

Attest:

DONALD J. QUIGG

Attesting Officer  Commissioner of Patents and Trademarks

UNITED STATES PATENT AND TRADEMARK OFFICE
CERTIFICATE OF CORRECTION

PATENT NO. : 4,594,645

DATED : June 10, 1986

INVENTOR(S) : Terashita, Yutaka

It is certified that error appears in the above-identified patent and that said Letters Patent is hereby corrected as shown below:

Title page:

The first name of the Inventor is misspelled.

--The first name of the Inventor should read as follows:

Yutak$\underline{a}$, Terashita--

Signed and Sealed this

Twenty-fourth Day of February, 1987

Attest:

DONALD J. QUIGG

Attesting Officer

Commissioner of Patents and Trademarks